United States Patent
Gu

(10) Patent No.: US 9,485,147 B2
(45) Date of Patent: Nov. 1, 2016

(54) METHOD AND DEVICE THEREOF FOR AUTOMATICALLY FINDING AND CONFIGURING VIRTUAL NETWORK

(71) Applicant: ZTE CORPORATION, Shenzhen, Guangdong (CN)

(72) Inventor: Zhongyu Gu, Shenzhen (CN)

(73) Assignee: ZTE Corporation, Guangdong (CN)

( * ) Notice: Subject to any disclaimer, the term of this patent is extended or adjusted under 35 U.S.C. 154(b) by 0 days.

(21) Appl. No.: 14/416,865

(22) PCT Filed: Jun. 21, 2013

(86) PCT No.: PCT/CN2013/077650
§ 371 (c)(1),
(2) Date: Jan. 23, 2015

(87) PCT Pub. No.: WO2013/185644
PCT Pub. Date: Dec. 19, 2013

(65) Prior Publication Data
US 2015/0188769 A1    Jul. 2, 2015

(30) Foreign Application Priority Data
Jul. 24, 2012  (CN) .......................... 2012 1 0257787

(51) Int. Cl.
*G06F 7/04* (2006.01)
*H04L 12/24* (2006.01)
*H04W 48/00* (2009.01)
(Continued)

(52) U.S. Cl.
CPC ....... *H04L 41/0886* (2013.01); *G06F 9/45558* (2013.01); *H04L 12/4641* (2013.01); *H04L 61/2015* (2013.01); *H04L 63/0272* (2013.01);
(Continued)

(58) Field of Classification Search
CPC ..................................................... H04L 63/10
USPC ............................................................ 726/3
See application file for complete search history.

(56) References Cited

U.S. PATENT DOCUMENTS

| 8,024,437 B2 | 9/2011 | Unbehagen et al. |
| 8,649,292 B2 * | 2/2014 | Zheng ................. H04L 12/2876 370/254 |
| 8,929,368 B2 | 1/2015 | Zhang |

FOREIGN PATENT DOCUMENTS

| CN | 1871813 | 11/2006 |
| CN | 101656724 | 2/2010 |
| CN | 102045248 | 5/2011 |

OTHER PUBLICATIONS

Extended European Search Report for PCT/CN2013/077650, Completed by the European Patent Office, Dated Jul. 3, 2015, 10 Pages.
Gu., Network Working Group, Internet- Draft, Expires: Jan. 7, 2013, Dated Jul. 6, 2012, 16 Pages, "The mechanism and protocol between VAP and TES to facilitate NVO3 draft-gu-nvo3-tes-nve-mechanism-00."
Kompella et al. Network Working Group, Internet-Draft, Expires: Jan. 10, 2013, Dated Jul. 9, 2012, 14 Pages, "Using Signaling to Simplify Network Virtualization Provisioning draft-kompella-nvo3-server2nve-00."

(Continued)

*Primary Examiner* — Anthony Brown
(74) *Attorney, Agent, or Firm* — Brooks Kushman P.C.

(57) ABSTRACT

A virtual network auto-discovery and auto-configuration method and device thereof are provided. The method includes a tenant end system automatically discovering network virtualization edges (NVEs), the NVE initiating a VN identity authentication of the tenant end system, and the NVE automatically configuring a VN forwarding table of the VN after the tenant end system passes the VN identity authentication. The method and device solve the technical problem that virtual network configuration efficiency is low due to manually configuring the virtual network, and achieve the technical effect of improving the virtual network configuration efficiency.

19 Claims, 7 Drawing Sheets

(51) Int. Cl.
*H04L 12/46* (2006.01)
*G06F 9/455* (2006.01)
*H04L 29/12* (2006.01)
*H04L 29/06* (2006.01)

(52) U.S. Cl.
CPC .............. *H04L 63/08* (2013.01); *H04W 48/00* (2013.01); *G06F 2009/45595* (2013.01)

(56) References Cited

OTHER PUBLICATIONS

International Search Report for PCT/CN2013/077650, English translation attached to original, Both completed by the Chinese Patent Office on Sep. 11, 2013, All together 7 Pages.

* cited by examiner

| 0 | 8 | 16 | 24 | 31 |
|---|---|---|---|---|
| Opcode | Hardware type | Hardware address length | The number of hops (Hops) | |
| Event ID(XID) ||||
| Second || Flag ||
| Client IP address (ciaddr) ||||
| Your IP address(yiaddr) ||||
| Server IP address(siaddr) ||||
| Relay agent IP address(giaddr) ||||
| Client hardware address:(chaddr) 16 bytes ||||
| Server's host name:(sname)64 bytes ||||
| Booting file name: (file)128 bytes ||||
| Option: length not fixed ||||

FIG. 9

| 0 | 8 | 16 | 24 | 31 |
|---|---|---|---|---|
| Opcode | Hardware type | Hardware address length | The number of hops (Hops) | |
| Event ID(XID) ||||
| | | |||
| The multi-tenant end system's IP address (TESiaddr) ||||
| NVE's IP address (NVEiaddr) ||||
| VN-ID ||||
| Relay agent IP address (giaddr) ||||
| NVE's hardware address(NVEhaddr) ||||
| TES's hardware address(TEShaddr) ||||
| VN's name (vnname) ||||
| Option ||||

FIG.10

METHOD AND DEVICE THEREOF FOR AUTOMATICALLY FINDING AND CONFIGURING VIRTUAL NETWORK

CROSS-REFERENCE TO RELATED APPLICATIONS

This application is a U.S. national phase of PCT Application No. PCT/CN2013/077650 filed Jun. 21, 2013 which claims priority to Chinese Application No. 201210257787.0 filed Jul. 24, 2012, the disclosures of which are incorporated in their entirety by reference herein.

TECHNICAL FIELD

The present document relates to the field of communications, and more particularly, to a virtual network auto-discovery and auto-configuration method, a tenant end system and a network virtualization edge (abbreviated as NVE).

BACKGROUND

With the development of network technologies and applications, in particular the development of cloud computing related IaaS (Infrastructure as a Service), PaaS (Platform as a Service) and SaaS (software as a Service), it becomes a relatively typical service needs to provide different network services in data center to different users. Because these services are generally facing to public users, and typically there are thousands, tens of thousands, or even hundreds of thousands of computers in the data center, the number of users that can be supported is relatively large, that is, in the data center, it needs to support a large number of virtual networks and provide mutually isolated network services for different users.

In the data center, a variety of technologies can be used to provide isolation between these different networks, for example, the VLAN (Virtual Local Area Network) can be used to isolate, or the L3/L2 VPN (Virtual Private Network) can be used to implement. However, due to inherent limitations of these technologies, it is difficult to obtain a good scalability. Therefore, the network virtualization technology over Layer 3 (L2) overlay, namely NVO3 (L2 "Network Virtualization Over L3" overlay, shorted as network virtualization over L3), is developed, and the basic idea of this network virtualization technology is that, virtual network messages are tunnel re-encapsulated by introducing the tunneling technology so as to distinguish different virtual networks through different tunnels. FIG. 1 is a schematic diagram of the network structure of a data center, as shown in FIG. 1, the introduction of NVE (Network Virtualization Edge) into the data center realizes the tunnel encapsulation of the virtual network, wherein, the NVE can be a Hypervisor, an access switch or a router, and so on.

The abovementioned tunnels can be defined and distinguished through a typical 24-bit field, so as to obtain up to sixteen million or so virtual networks, which can meet the needs of a large number of users and solve the problem of scalability.

However, the current typical VN provision needs to manually configure the NVE in order to generate the relevant VN. However, in the case that the data center has tens of thousands, or even hundreds of thousands of servers/PCs/virtual machines (VMs) and possibly supports tens of millions of virtual networks, the workload of this manual configuration is huge, thus affecting the development efficiency of the VN service. Furthermore, in the related art, the VM cannot automatically discover the desired NVE and also needs manual operation, which would also greatly affect the development efficiency of the VN service.

SUMMARY

The embodiment of the present document provides a virtual network auto-discovery method, an auto-configuration method and device thereof, to at least solve the technical problem in the related art that the virtual network configuration efficiency is low due to the manual configuration.

According to one embodiment of the present document, a virtual network auto-discovery and auto-configuration method is provided, and comprises: a tenant end system automatically discovering network virtualization edges (NVEs); the NVE initiating a virtual network (VN) identity authentication of the tenant end system; the NVE automatically configuring a VN forwarding table of the VN after the tenant end system passes through the VN identity authentication.

The step of the tenant end system automatically discovering network virtualization edges (NVEs) comprises: the tenant end system sending a network virtualization edge (NVE) auto-discovery broadcast message carrying a virtual network attribute; the tenant end system receiving a NVE existing message returned by the NVEs; the tenant end system selecting one of the PVEs which send the NVE existing message as a serving NVE of the tenant end system, and sending a NVE request message to the serving NVE; the tenant end system receiving a NVE confirmation message sent by the serving NVE.

The NVE auto-discovery broadcast message, the NVE existing message, the NVE request message and the NVE confirmation message are specified types of messages, wherein, a message type field is included in the specified types of messages, and the value of the message type field is pre-defined.

The virtual network attribute is a virtual network's identifier VN-ID and/or a virtual network's name.

All of the NVE auto-discovery broadcast message, the NVE existing message, the NVE request message and the NVE confirmation message comprise a field indicating the VN-ID; the NVE auto-discovery broadcast message and the NVE request message comprise a field indicating the virtual network's name.

The NVE auto-discovery broadcast message, the NVE existing message, the NVE request message and the NVE confirmation message are messages in a PPPoE with a new version number, wherein, the messages in the PPPoE with the new version number comprise a field indicating the VN-ID information.

The NVE auto-discovery broadcast message, the NVE existing message, the NVE request message and the NVE confirmation message comprise a TAG field indicating the virtual network VN and/or NVE attributes, wherein, the TAG field comprises at least one of the following: VLAN information, QoS requirement information, IP address information of the tenant end system, NVE type information, NVE capability information, and public keys supported in messages between the tenant end system and the NVEs.

The tenant end system comprises at least one of the following: a virtual machine (VM), a physical computer, or a server.

The NVE auto-discovery broadcast message, the NVE existing message, the NVE request message and the NVE confirmation message are implemented with L3 messages.

The NVE auto-discovery broadcast message, the NVE existing message, the NVE request message and the NVE confirmation message comprise: fields used to indicate the VN's name, the VN-ID, the NVE's physical address, and the NVE's IP address.

The field used to indicate the VN's name, the VN-ID, the NVE's physical address and the NVE's IP address are standalone fields in the NVE auto-discovery broadcast message, the NVE existing message, the NVE request message and the NVE confirmation message, or are represented with option fields.

The NVE auto-discovery broadcast message, the NVE existing message, the NVE request message and the NVE confirmation message are messages in a DHCP with a new version number, wherein, the messages in the DHCP with the new version number comprise fields indicating the VN's name, the VN-ID, the NVE's physical address, and the NVE's IP address; the fields used to indicate the VN's name, the VN-ID, the NVE's physical address and the NVE's IP address are obtained by adding new fields into the DHCP messages with the old version number or implemented with new option fields.

The step of the NVE initiating a virtual network (VN) identity authentication of the tenant end system comprises: the NVE initiating a VN identity authentication of the tenant end system after sending the NVE confirmation message.

The VN identity authentication method comprises: Point to Point Protocol (PPP), or Extensible Authentication Protocol (EAP), or 802.1x.

The step of the NVE automatically configuring the VN forwarding table of the VN comprises: judging whether there exists a VN instance in the NVE or not; if there exists a VN instance, the NVE directly adding an entry corresponding to the tenant end system into the VN forwarding table in the existing VN instance; if there exists no VN instance, the NVE generating a VN instance, wherein the VN instance comprises: a VN forwarding table; the NVE adding an entry corresponding to the tenant end system into the VN forwarding table in the generated VN instance.

The VN forwarding table is a forwarding table based on MAC address, or a routing and forwarding table based on IP address.

According to another embodiment of the present document, a tenant end system is provided, and comprises: a sending unit, configured to send a network virtualization edge (NVE) auto-discovery broadcast message carrying virtual network attribute; a receiving unit, configured to receive a NVE existing message returned by NVEs; a processing unit, configured to select one of the NVEs sending the NVE existing message as a serving NVE of the tenant end system; wherein the sending unit is further configured to send a NVE request message to the serving NVE, and the receiving unit is further configured to receive a NVE confirmation message sent by the serving NVE; the tenant end system further comprises: an authenticating unit, configured to perform a virtual network (VN) identity authentication with the NVE after the receiving unit receives the NVE confirmation message sent by the serving NVE.

The NVE auto-discovery broadcast message, the NVE existing message, the NVE request message and the NVE confirmation message are specified types of messages, wherein, the specified types of messages comprise a message type field, and the value of the message type field is pre-defined.

The tenant end system comprises at least one of the following: a virtual machine (VM), a physical computer, or a server.

The NVE auto-discovery broadcast message, the NVE existing message, the NVE request message and the NVE confirmation message are L2 messages, or are implemented with L3 messages.

The authenticating unit comprises: an authenticating module, configured to support using the Point to Point Protocol (PPP) or the Extensible Authentication Protocol (EAP) or the 802.1x to perform a VN identity authentication of the tenant end system.

According to another embodiment of the present document, a network virtualization edge is provided, and comprises: a receiving unit, configured to receive a network virtualization edge (NVE) auto-discovery broadcast message carrying virtual network attribute sent by the tenant end system; a sending unit, configured to send a NVE existing message to the tenant end system in response to the NVE auto-discovery broadcast message; wherein the receiving unit is further configured to receive the NVE request message sent by the tenant end system in response to the NVE existing message; the sending unit is further configured to send a NVE confirmation message to the tenant end system in response to the NVE request message; an authenticating unit, configured to perform a virtual network (VN) identity authentication of the tenant end system after the sending unit sends the NVE confirmation message; a processing unit, configured to generate a VN instance in the case that the tenant end system passes through the virtual network (VN) identity authentication and the network virtualization edge (NVE) does not have a VN instance, wherein, the VN instance comprises: a VN forwarding table; the NVE adds an entry corresponding to the tenant end system in the VN forwarding table; or directly adds an entry corresponding to the tenant end system in the VN forwarding table in the existing VN instance in the case that the tenant end system passes through the VN identity authentication and the NVE already has a VN instance; a forwarding unit, configured to store the VN forwarding table and forward messages according to the VN forwarding table.

The authenticating unit comprises: an authenticating module, configured to initiate a VN identity authentication of the tenant end system after the sending unit sends a NVE confirmation message, and obtain a VN-ID after the tenant end system passes through the VN identity authentication, and send an authentication success response message and the VN-ID to the tenant end system.

The authenticating module is further configured to support using the Point to Point Protocol (PPP), the Extensible Authentication Protocol (EAP) or the 802.1x to perform a VN identity authentication of the tenant end system.

The VN forwarding table is a forwarding table based on MAC address, or a routing and forwarding table based on IP address.

The receiving unit is further configured to support receiving other control protocols and service data; the sending unit is further configured to support sending other control protocols and service data; the processing unit is further configured to support processing other control protocols, and updating contents of the VN forwarding table in accordance with other control protocols.

The NVE comprises at least one of the following: a Hypervisor, an access switch, a router or another network device.

In an embodiment of the present document, by the interaction between the VM's tenant end system and the NVE, it can achieve that the tenant end system automatically discovers the NVEs. In addition, the NVE can be automatically configured according to the VN Related information after the VM's tenant end system passes the authentication, so that it does not need to manually configure the NVE accordingly, so as to solve the technical problem in the related art that the virtual network configuration efficiency is low due to manually configuring the virtual network, and achieve the technical effect of improving the virtual network configuration efficiency.

BRIEF DESCRIPTION OF THE DRAWINGS

The accompanying drawings described herein are used to provide a further understanding of the embodiment of the present document and constitute a part of the present application, exemplary embodiments of the present document and their description are used for explaining the present document and do not constitute an improper limitation of the present document. In the accompanying drawings;

FIG. 9 is a schematic diagram of an existing DHCP message format in accordance with an embodiment of the present document;

FIG. 10 is a schematic diagram of an auto-discovery message encapsulation format in accordance with an embodiment of the present document;

PREFERRED EMBODIMENTS OF THE DOCUMENT

Hereinafter in reference to the accompanying drawings, the embodiments of the present document will be described in detail. It should be noted that, in the case of no conflict, the embodiments and features in the embodiments of the present application may be combined with each other.

The First Embodiment

Figure 1:
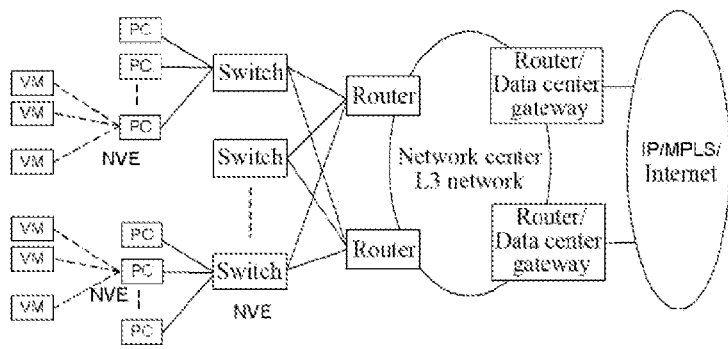
FIG. 1 is a schematic diagram of the network structure of a data center in accordance with the related art.
Figure 2:
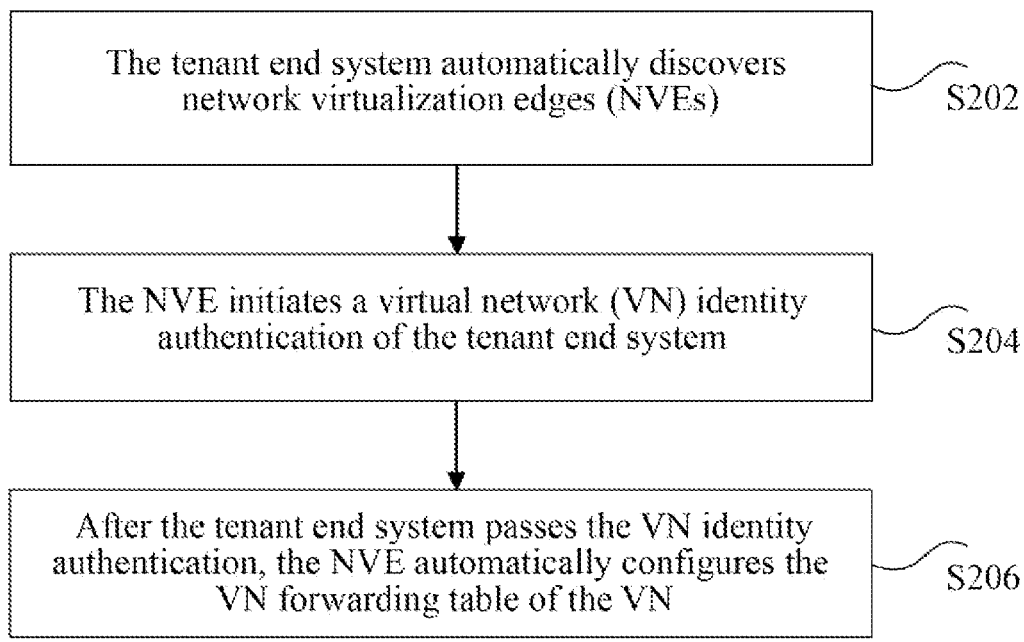
FIG. 2 is a preferred flow chart of a virtual network auto-discovery and auto-configuration method in accordance with an embodiment of the present document.

As shown in FIG. 2, the embodiment of the present document provides a preferred virtual network auto-discovery and auto-configuration method, and the method comprises the following steps.

In step S202, the tenant end system automatically discovers network virtualization edges (NVEs). In this embodiment, the tenant end system may comprise but are not limited to at least one of the following: a virtual machine (VM), a physical computer, or a server.

In step S204, the NVE initiates a virtual network (VN) identity authentication of the tenant end system. In the present embodiment, the step of the VE initiating a virtual network (VN) identity authentication of the tenant end system comprises: after sending the NVE confirmation message, the NVE initiating a VN identity authentication of the terminal tenant system. Preferably, the NVE obtains a VN-ID and sends an authentication success response message and the VN-ID to the tenant end system after the tenant end system passes through the VN identity authentication.

Preferably, the PPP or the EAP or the 802.1x may be used to perform the NV identity authentication.

In step S206, after the tenant end system passes through the VN identity authentication, the NVE automatically configures the VN forwarding table of the VN. The present embodiment provides a preferred scheme of the NVE automatically configuring the VN forwarding table of the VN, which specifically comprises: S1, judging whether there exists a VN instance in the NVE or not; S2, if there exists a VN instance, the NVE directly adding an entry corresponding to the tenant end system into the VN forwarding table in the existing VN instance; S3, if there exists no VN instance, the NVE generating a VN instance, wherein the VN instance comprises: a VN forwarding table; the NVE adding an entry corresponding to the tenant end system into the VN forwarding table in the generated VN instance.

Preferably, the VN forwarding table is a forwarding table based on MAC address, or a routing and forwarding table based on IP address.

Figure 3:
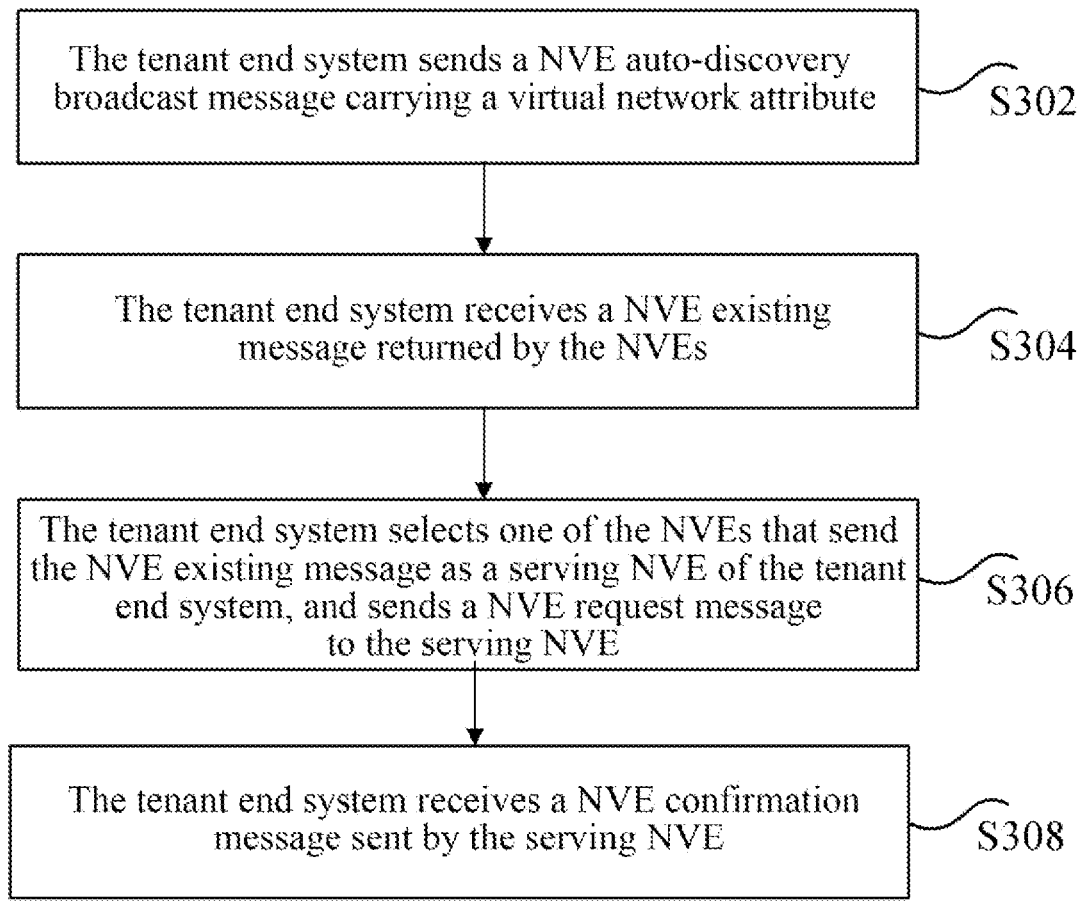
FIG. 3 is a preferred flow chart of a virtual network auto-discovery method in accordance with an embodiment of the present document.

The present document can also individually protect the virtual network auto-discovery method shown in FIG. 3, and the abovementioned step of the NVE automatically configuring the VN forwarding table of the VN, and the present document does not make limitations on this.

In an embodiment of the present document, the NVE can be automatically configured according to the VN related information after the tenant end system such as VM is authenticated successfully, thereby with no need of manually configuring the NVE accordingly, so as to solve the technical problem that the virtual network configuration efficiency is low due to manually configuring the virtual network, and achieve the technical effect of improving the virtual network configuration efficiency.

FIG. 3 shows a preferred embodiment of the virtual network auto-discovery method, in the present embodiment, the process of automatically discovering the virtual network comprises: the step of the tenant end system automatically discovering network virtualization edges (NVEs), which step comprises the following processing.

In S302, the tenant end system sends a network virtualization edge (NVE) auto-discovery broadcast message carrying virtual network attribute. In the present embodiment, the virtual network attribute may comprise but is not limited to the virtual network's identifier (VN-ID) and/or the virtual network's name.

In S304, the tenant end system receives a NVE existing message returned by the NVEs.

In S306, the tenant end system selects one of the NVEs that send the NVE existing message as a serving NVE of the tenant end system, and sends a NVE request message to the serving NVE.

In S308, the tenant end system receives a NVE confirmation message sent by the serving NVE.

The embodiment of the present document provides a variety of improved methods for achieving the NVE auto-discovery broadcast message, the NVE existing message, the NVE request message and the NVE confirmation message, and in the following, these improved methods will be described in detail. It should be noted that the following improved methods may be combined to use in the case of no conflicts and the present document does not make limitations on this.

As an improved method, the NVE auto-discovery broadcast message, the NVE existing message, the NVE request message and the NVE confirmation message are specified types of messages, wherein, the specified types of messages comprise a message type field, and the value of the message type field is pre-defined.

As another improved method, the NVE auto-discovery broadcast message, the NVE existing message, the NVE request message and the NVE confirmation message comprise a field indicating the VN-ID; the NVE auto-discovery broadcast message and the NVE request message comprise a field used to indicate the virtual network's name.

As another improved method, the NVE auto-discovery broadcast message, the NVE existing message, the NVE request message and the NVE confirmation message are messages in the PPPoE with the new version number, wherein the messages in the PPPoE with the new version number comprises a field used to indicate the VN-ID information.

As another improved method, the NVE auto-discovery broadcast message, the NVE existing message, the NVE request message and the NVE confirmation message comprise a TAG field used to indicate the virtual network (VN) and/or NVE attributes, wherein, the TAG field comprises at least one of the following: VLAN information, QoS requirement information, IP address information of the tenant end system, NVE type information, NVE capability information, and public keys supported in messages between the tenant end system and the NVEs.

As another improved method, the NVE auto-discovery broadcast message, the NVE existing message, the NVE request message and the NVE confirmation message are implemented with L3 messages.

As another improved method, the NVE auto-discovery broadcast message, the NVE existing message, the NVE request message and the NVE confirmation message comprise: a field used to indicate the VN's name, the VN-ID, the NVE's physical address, and the NVE's IP address.

As another improved method, the fields used to indicate the VN's name, the VN-ID, the NVE's physical address and the NVE's IP address are standalone fields in the NVE auto-discovery broadcast message, the NVE existing message, the NVE request message and the NVE confirmation message, or are represented with option fields.

As another improved method, the NVE auto-discovery broadcast message, the NVE existing message, the NVE request message and the NVE confirmation message are messages in the DHCP with the new version number. Wherein, the messages in the DHCP with the new version number comprise fields indicating the VN's name, the VN-ID, the NVE's physical address and the NVE's IP address. The fields used to indicate the VN's name, the VN-ID, the NVE's physical address and the NVE's IP address are obtained by adding new fields into the DHCP messages with the old version number or implemented with new option fields.

In an embodiment of the present document, by the interaction between the NVE and the VM's tenant end system, it can achieve that the tenant end system can automatically discover the NVE, so that it does not need to manually discover the NVEs accordingly, so as to solve the technical problem that the virtual network configuration efficiency is low due to manually configuring the virtual network, and achieve the technical effect of improving the virtual network configuration efficiency.

The Second Embodiment

Figure 4:
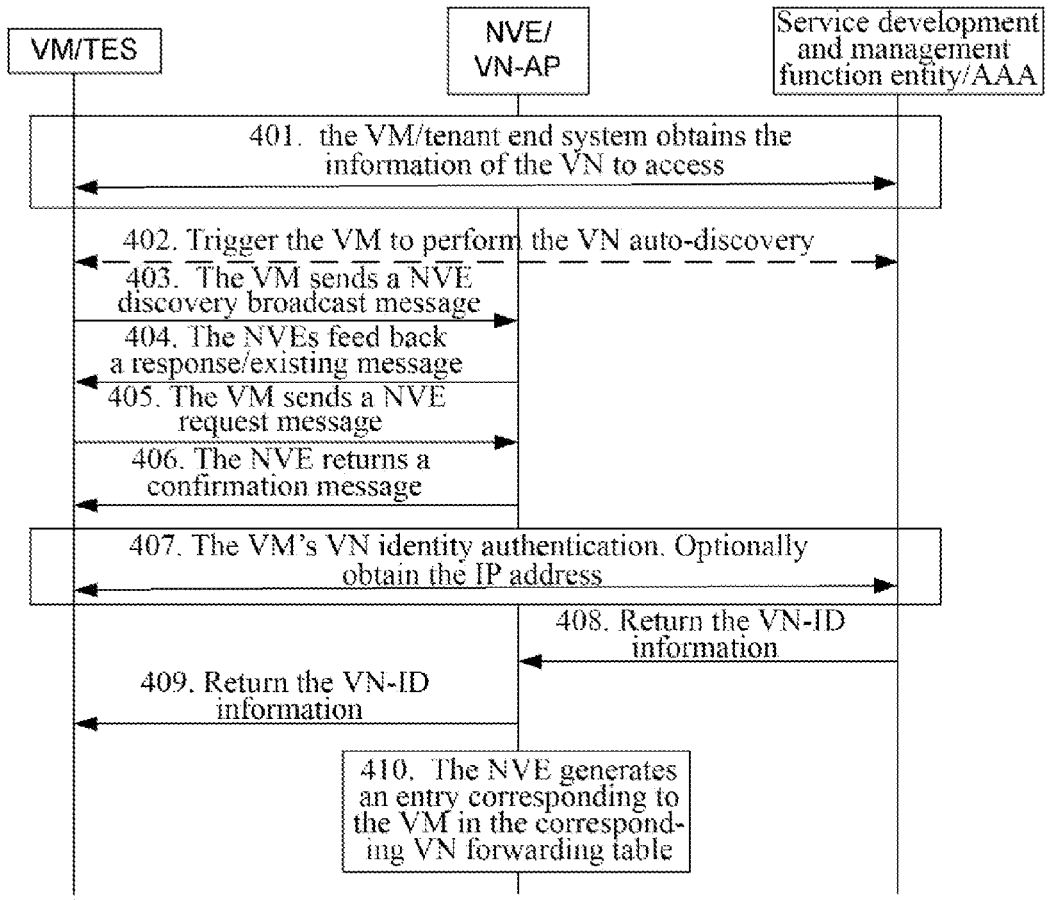
FIG. 4 is another preferred flow chart of a virtual network auto-discovery and auto-configuration method in accordance with an embodiment of the present document.

FIG. 4 is a flow chart of a specific implementation of the virtual network auto-discovery and auto-configuration method in accordance with an embodiment of the present document. As shown in FIG. 4, the abovementioned method comprises the following steps.

In step 401, the computer system in the virtual network (VN), or so-called tenant end system (TES), obtains the related information of the VN to be accessed.

Wherein, the TES refers to a virtual machine (VM), a physical computer, a server or another computer equipment. For simplicity of description, the VM is used to represent the tenant end system in the following description.

The VN related information most basically needs to comprise but does not limits to at least one of the following: the VN's name and the VN's identifier (VN-ID).

Preferably, the TES user or administrator can obtain the abovementioned VN related information through internal company announcement or from the relevant departments within the company, or can obtain the abovementioned VN related information from the service website of the service provider. Of course, before obtaining the abovementioned VN-related information, the user needs to carry out an application/subscription process with the service providers, and the specific implementations may be applying through online service development portal, or subscribing through the service providers' agencies and negotiating the VN related information, for example, negotiating about how many VMs/computers are needed, as well as the network connection bandwidth and other parameters. The VN-related information may further comprise but is not limited to the following VN information: such as the number of VMs in the VN; the VM's processing capability; the VN's network connection bandwidth; the QoS parameter; relevant information supported by the VLAN, the IP address range in use; the MAC address range in use, and so on.

The VN related information may be also possible to be obtained by directly writing the related necessary information into the VM based on the VN's subscription through the VM provider, so that the VM can directly use it.

It needs to illustrate that one user may apply to operators for multiple VNs at the same time. However, the processing of each VN may use the same or similar process, therefore it will not have a substantial influence on the subsequent description of the present document.

In Step 402, trigger the VM to perform the VN auto-discovery and auto-access process.

The VN auto-discovery and auto-access process of the VM can be triggered by the VM provider/operator, or the VN user himself/herself according to the aforementioned application/subscription process about who will initiate the process. One possibility is that, the user only wants to obtain one applied VN, then the VM access process in the VN may be initiated by the operator; another case is that, if what the user obtains are separate VMs, the user needs to initiate the VN discovery process by himself/herself, and generate or obtain the desired VN.

It should be noted that, the VM provider and the VN provider may be the same, or may be different. Therefore, the processing will be slightly different, however, it should be the VM provider which triggers the VN access process under both situations, but the VM provider needs to obtain the VN information.

The specific booting realization is typically implemented by one of the VM's program functions. Generally, it needs to perform a program function called the VN auto-discovery and auto-access.

In Step 403, the VM sends a NVE/virtual network access point (VN-AP) discovery message through a specific type of Ethernet broadcast message/frame/packet.

Figure 5:
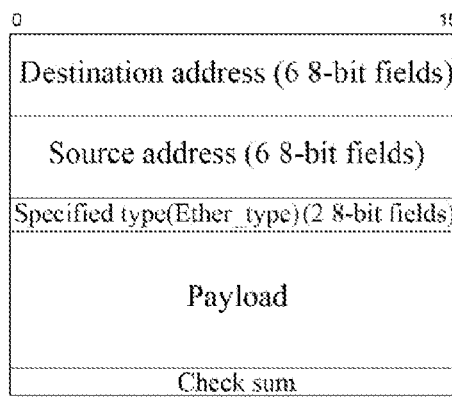
FIG. 5 is a schematic diagram of an Ethernet frame structure in accordance with an embodiment of the present document.
Figure 6:
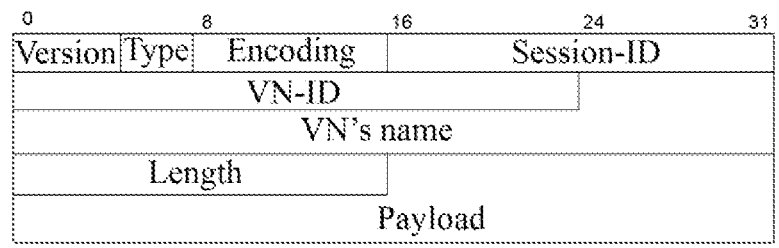
FIG. 6 is a schematic diagram of a payload in the Ethernet frame structure in accordance with an embodiment of the present document.

FIG. 5 and FIG. 6 show the auto-discovery message used in the present embodiment, and the frame structure of subsequent relevant messages in the present embodiment, which consists of two parts: the first part, the auto-discovery message is one kind of Ethernet frame/message; the second part, specific contents of the auto-discovery message are defined through the payload (portion) of the Ethernet frame.

FIG. 5 is the frame format of the Ethernet message of the auto-discovery message. Wherein the destination address is the broadcast address in the auto-discovery message. In other messages, it may be the NVE/VM's MAC address. The source address is the VM/VNE's MAC address. The specified type is an Ethernet type different from the existing Ethernet type and devoted to the VN auto-discovery. Generally in the large-scale deployment, this type can be one selected from the types provided in the IEEE, and needs the IEEE's approval. A specific reference example is that, the value of Ethernet type of the PPPoE discovery phase message is 0x8863 (that is, hexadecimal 8863).

FIG. 6 shows the definition of fields in the payload of the broadcast message. Wherein, it comprises: the field of VN's name, used to indicate the VN to be accessed. The selection and length of the related name can be selectively defined, for example, the field comprises the operator's name, geographic information, the VN user's name and the related number information, such as ZTE_CT_VN1, which indicates the virtual network VN1 applied by the ZTE to China Telecom (CT). Of course, this information can be determined according to the specific negotiation between the user and the operator. In short, it is a string value. Of course, in the global deployment, it needs to consider avoiding the problem of having the same name that other operators have. The frame structure further comprises a VN-ID field used to carry an identifier to distinguish different VNs. The VN-ID may be the 24 bits in the current NVO3, and can also be adjusted according to the situation, for example, it can be 16-bit or 32-bit, the present document does not limit how many bits that the VN-ID has. The particular number of bits being used does not have a substantial impact on the present document, but the frame format need to be adjusted accordingly.

Figure 7:
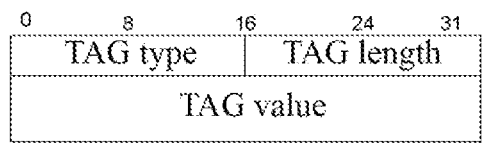
FIG. 7 is a schematic diagram of fields in the payload in accordance with an embodiment of the present document.

Since it also needs to transport other parameters in the interaction process between the VM and the NVE, it needs to define other information fields needed by the embodiment of the present document to carry the information of these necessary parameters in the payload shown in FIG. 6. As shown in FIG. 7, an option called TAG is used to carry the related parameter information. FIG. 7 is a definition of the format of the information option TAG, comprising the TAG type, the TAG length and the TAG value and so on.

The messages such as the auto-discovery broadcast message may comprise zero (that is none) or more TAG options.

In the messages of this step, alternatively, the VN's name can also be transported through one TAG. The benefit is that for messages that do not need the VN's name, the length of the messages can be reduced.

In Step 404, all the NVEs in the broadcast domain feed back a response message or a NVE response message to indicate that there exist NVEs.

Herein, in one L2 broadcast domain where the VM is located, if it needs to carry out the service, it must arrange at least one NVE/VN-AP in each related L2 broadcast domain.

To support the NVE's strategy selection, it needs to include a TAG information field for the NVE type to indicate the NVE type in the response message, for example, it can be a Hypervisor, or an access switch, or another network device such as router or gateway device. In general, from the network strategy, in the case that there are the switch and Hypervisor NVEs, preferably the switch NVE will be selected.

In general, alternatively, it may also comprise a TAG indicating the name of the VNE provider to support the NVE's selection.

In Steps 405-406, the VM selects one NVE/VN-AP from a plurality of responses as its serving NVE according to the specific strategies. The VM sends a NVE/VN-AP request message to the selected NVE/VN-AP and receives a response/confirmation message returned by it to confirm that the NVE/VTEP/VN-AP is the NVE/VTEP/VN-AP that is needed to process the VN.

When the NVE/VN-AP may comprise the Hypervisor and the access switch, preferably the access switch is used to process, and of course, specialized devices can also be used to process. The relevant selection strategy is determined mainly according to the service needs and the NVE/VN-AP processing capability (in general, the processing capability of the access switch is higher than that of the Hypervisor; or may comprise one NVE's processing capability TAG), as well as the operator.

The NVE confirmation message comprises a SESSION-ID field whose value is specially selected by the NVE to distinguish from the information exchange with the VM. The subsequent processing, including the VM's VN identity authentication and the VM's information transmission, needs to use the SESSION-ID, otherwise reject processing or discard messages sent by the VM and not carrying the SESSION-ID. It should be noted that, the SESSION-ID is an option but not a must, and with it, it can increase the security of the system. The description of the options herein needs to be considered for the contents related to the SESSION-ID in the subsequent related processing.

The messages in steps 403-406 can be respectively called NVEDISCOVER, NVEOFFER, NVEREQUEST and NVE-CONFIRM. Of course, the names are not important, and other names can be used. These messages can be defined and distinguished with the encoding field in FIG. 6.

After the NVE receives the VM request message, it selects a SESSION-ID and returns a NVE confirmation message, and the NVE is ready to enter the next step. After the VM receives the NVE confirmation message, it also enters the operation in the next phase. Specifically, it comprises the abovementioned VM identity authentication and the subsequent information transmission, and the like. All messages in this next phase use another specified Ethernet message type. The value of this specified type is similar to the description in step 403. For the definition of specific message formats in this phase, a custom format similar to FIG. 6 can still be used. The specific message type is defined through the encoding. However, the field related to the VN's name can be placed in the TAG option in the payload. This reduces the length of the message header, so as to improve the transmission efficiency.

In Step 407, the NVE/VN-AP initiates the identity authentication of the VM accessing the VN.

The specific identity authentication method is not limited herein, and different authentication schemes can be used according to the specific user needs. For example, the existing PPP/EAP or 802.1x authentication mechanism can be used. Specifically, the AAA server may be used to store the pre-established VN characteristic/attributes information, including the VN's name, the VN-ID, the VN user's public key, the possible number of VLANs of the user, the access interface rate, and other parameters.

Herein, the VM may also actively initiate the identity authentication. One principle is that before the VM passes through the identity authentication, it can only send control information such as the authentication request, and all the related data transmission information will be forbidden.

In Step 408, after the VM passes through the VN identity authentication, the NVE/VN-AP obtains the VN's VN-ID, possible VLAN ID of the VM, and other information. The VN-ID may be determined at the time of subscription or temporarily generated by the operator according to the specific network situation. This can be determined according to the specific implementation strategies.

Preferably, it can also obtain the VM's IP address information, or the IP address information should be confirmed via VN.

In Step 409, the NVE/VN-AP transports the VN-ID to the VM. Alternatively, the NVE transports the VM's VLAN information to the VM.

After the VM passes through the VN identity authentication, it obtains the VN-ID information, and for the subsequent messages, SESSION-ID and VN-ID must be used to distinguish the information transmission between the VM and the NVE. As above description, if the SESSION-ID is an option, then here it only needs the VN-ID to identify the information.

In Step 410, if there is no VN instance in the NVE/VN-AP, it needs to generate the VN instance, wherein the VN instance comprises a VN forwarding table; the NVE/VN-AP generates an entry corresponding to the VM in the corresponding VN forwarding table. If there already has a VN instance in the NVE, then directly generate the corresponding entry in the VN forwarding table.

The entries in the forwarding table comprise but are not limited to: the VM's MAC address information and the NVE's IP address information, and optionally the VLAN information, as well as the corresponding interface information.

It should be noted that, herein it may also generate a routing and forwarding table, which is not the aforementioned forwarding table based on MAC address, but a forwarding table based on IP address. After the VM passes through the VN authentication, it also confirms its IP address information at the same time, the IP address may be allocated to the VM during the VN authentication or obtained according to the subscription and confirmed through the authentication, thereby taking the IP address to form the corresponding entry in the VN forwarding table. It also needs to be illustrated here that the entries in the routing and forwarding table need the corresponding interface information, and herein physical or logical interfaces between the VM and the NVE can be used to distinguish, and particularly, a VLAN may be used to distinguish.

In the case that the VM's IP address is obtained during the subscription, one TAG can be included in the auto-discovery message to carry this IP address.

Another benefit of using the IP routing and forwarding table is that, it can integrate the IP address prefix, so as to reduce the size of the forwarding table and save the NVE resource utilization, or make the NVE have better scalability. Since it supports the route integration, there appears another case in processing the forwarding table, that is, the entry corresponding to the VM may have been covered by the previous VM entry, therefore, the processing of the VN forwarding table may not need to add any new entries, as long as the NVE confirms the existence of the entry. Thereafter, the NVE needs to announce the newly added VM information within VN through the data plane learning mechanism or the control plane protocol, so as to synchronize the information of the NVE involved in the VN, and enable information transmission between different end systems in the VN.

The Third Embodiment

The method given in the second embodiment needs the IEEE to allocate two new Ethernet frame types. Generally, these types are a resource that may be relatively short or difficult to obtain. For this reason, the existing Ethernet type can be taken advantage to extend to achieve the NVE's auto-discovery and other related functions. The difference between the present embodiment and the abovementioned embodiments is to provide an alternative solution, specifically comprising: the existing PPPoE Ethernet type can be used to extend the definition of related messages in the protocol, so as to implement the NVE auto-discovery process which is to be solved in the present document.

In order to be compatible with and distinguish from the existing protocols, the specific implementations may comprise: using a new PPPoE version number, such as version 2, to show the difference from the existing PPPoE (version 1), and to indicate that this new version is mainly used for the NVE auto-discovery function.

Due to the need to transport the VN related information, it needs to add a new field VN-ID, and optionally it also supports a field of VN's Name. The related VN's name information can be transported through a new TAG type and via the payload of the message.

In addition, it also needs to extend and define the relevant encoding fields of the PPPoE, and requires at least four more new types to support four message types such as the NVE auto-discovery and the NVE confirmation in the second embodiment.

Specifically, the existing PPPoE version 1 supports several message types whose encoding types are: 0x09, 0x07, 0x19, 0x65 and 0xa7. Other values that are not currently in use can be selected to define, but it should be in line with existing norms, conventions, and so on. Similarly, the processing of the TAG option can also be deduced from it. That is, excluding the existing definitions of 0x0000, 0x0101-0x0105, 0x0110 and 0x0201-0x0203, other values can be used to define the related options in the present document. Again, the selection of these values needs to pay attention to be in line with existing norms, conventions, and so on.

That is, the frame in the new version is not compatible with the frame in the existing version. However, in the point of view of achieving functions, there is no any influence since the version numbers are used to distinguish.

The Fourth Embodiment

On the basis of the abovementioned embodiments, the termination of the session between the VM and the VNE, that is, disconnecting the session connection between the VM and the NVE, can be achieved by the VM or the NVE sending an termination message. The termination message is transported by a TAG type.

The NVE needs to automatically update the corresponding VN forwarding table according to the change of the connection, in particular after the connection is disconnected.

The Fifth Embodiment

Alternatively, the NVE auto-discovery process or protocol can have a keep-alive mechanism to monitor the connection between the VM and the NVE. Generally it can be implemented by sending the hello message regularly. The specific time interval can be set according to the actual needs.

The NVE needs to automatically update the corresponding VN forwarding table according to the changes in the connection between the VNE and the VM, especially after the connection is disconnected.

Combined with the situation when the VM migration makes the connection disconnected, it needs to automatically update the corresponding VN forwarding table. Accordingly, for the case of VM migration, the VM needs to perform the automatic discovery of other NVE, and this process is actually the process of the VM automatically discovering the VN/NVE, except that it triggers the related processes under the management of the Hypervisor/VMM.

The Sixth Embodiment

The above content (embodiments 2-5) are aiming for/ using L2 protocols and methods (Layer 2), and furthermore the L3 (Layer 3) protocols and methods can also be used to achieve the NVE auto-discovery. For example, such as the DHCP, in which the L3 broadcast messages and related mechanisms can be used and extended to define the procedures and related protocol fields in order to realize the functions such as the NVE auto-discovery and auto-accessing.

In order to achieve this expansion, firstly it needs to understand the basic protocol features needed by the existing DHCP to implement the NVE auto-discovery and automatic accessing, and it specifically comprises: protocol format, related protocol parameters, and protocol procedures.

Figure 8:
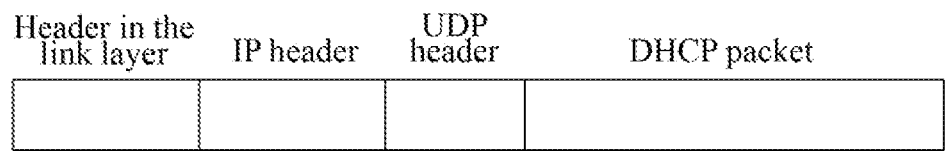
FIG. 8 is a schematic diagram of a DHCP message encapsulation format in accordance with an embodiment of the present document.

FIG. 8 is a DHCP message encapsulation format. The DHCP is defined through the UDP. Therefore, the DHCP message encapsulation further comprises: IP header and message header in the link layer.

The DHCP processes comprise: several steps such as DHCP discover, DHCP offer, DHCP request, and DHCPpack, wherein, the DHCP discover is an IP broadcast message, that is, its destination IP address is the subnet broadcast address with all 1 s. Specifically, a basic process of obtaining the IP address of the DHCP comprises: the DHCP client discovering a DHCP server through the DHCPdiscover and requesting for an IP address; the DHCP servers in the local broadcast domain returning the IP address allocation/distributions they can provide; the DHCP client selecting one from possible multiple DHCP offers as its DHCP server, and applying to the DHCP server for an address; after the DHCP server receives the application, it confirming the IP address allocation.

The specific DHCP messages are distinguished through the well-known port numbers 67 and 68 of the UDP.

It should be illustrated that, the DHCP itself has relatively a lot of contents, and herein only the basic contents related to the present document are mentioned, and for other detailed contents, please refer to the relevant protocol documentations.

FIG. 9 is a detailed definition of DHCP messages. Wherein, Opcode defines the DHCP message type, and currently 2 types are defined, one is BOOTREQUEST (DHCP application), and the other one is BOOTREPLY (DHCP response). The option field defines the type of the DHCP's message related to the address application, that is, the DHCPDISCOVER, DHCPOFFER, DHCPREQUEST, DHCPACK and so on used in the previous steps of discovering, offering, requesting and confirming. Because the DHCP also inherits purposes of other protocols (mainly BOOTP) and also needs to transport a variety of network parameters besides of automatically allocating the IP addresses, the DHCP is too complicated considering that we just need to learn from the functionality of DHCP server discovery.

For this reason, the present embodiment makes the following processing. There are two cases. The first case is to continue using and extending the existing DHCP mechanism, in particular, still use the well-known port numbers of the UDP of the DHCP, but use new opcodes to encode, for example, use the existing DHCP opcodes to encode, and newly define opcode 3 as the VNE discovery message, and opcode 4 as the VNE discovery feedback message. The second case is that, use a brand new design similar to the well-known port numbers of the DHCP, and completely use new UDP port numbers to distinguish new NVE discovery protocols.

In either case, some special information fields are needed to transport related information in the NVE discovery process. The related information may comprise: the VN's name, the VN-ID, the VNE's IP address, and optional VNE's MAC address, the IP address of the tenant end system, the optional MAC address, and others, such as the VLAN information, the QoS information, the public key information, and the like. These can be defined by option fields in the message format.

As shown in FIG. 10, the definition of relevant fields uses a similar DHCP definition. This format is only a reference, and in a specific protocol design, some adjustments can be made according to some other requirements, such as compliance with existing norms or conventions. FIG. 10 only shows some of the key information related to the embodiments of the present document. Some of the items therein may have separate explicit fields, as shown in FIG. 10. It may also be included in option fields to define, as the existing DHCP message encoding. Although the information format is different from the DHCP message format, the VNE discovery process still uses the existing DHCP process, especially the DHCP server discovery process, but the DHCP confirmation message carries the NVE's IP address and the optional NVE's MAC address.

The definition of related options can also refer to the existing definition of DHCP, and it needs to exclude the existing defined types and use some of the values not being used. Of course, it also needs to consider being in line with relevant regulatory requirements in the existing standards or the conventions.

So far, although the VM discovers the related NVE, further measures are still needed about how to access to the VN, and how to guarantee the isolation between the VNs. Specifically, the methods in the embodiments 2-5 can be used to obtain the NVE's IP address and MAC address information after the VNE discovery process via the L3, and generate a Session-ID so that the Session-ID can be used between the VM and the VNE to securely exchange the information. The Ethernet type messages specified in the embodiments 2-5 can be used to exchange information. For the related Session-ID and VN-ID information, new fields can be added in FIG. 10, or they can be defined and carried in the option fields. It should be illustrated that, the Session-ID can also be used as an option.

In the subsequent process, it also comprises the VN selected by the VM performing the identity authentication of the VM, and generating a corresponding entry in the forwarding table in the VN after the authentication is successful. Of course, if the VM is the first VM of the VN on the VNE, that is, there is no information about this VN instance on the VNE yet, then generate the related VN instance.

The Ninth Embodiment

Figure 11:
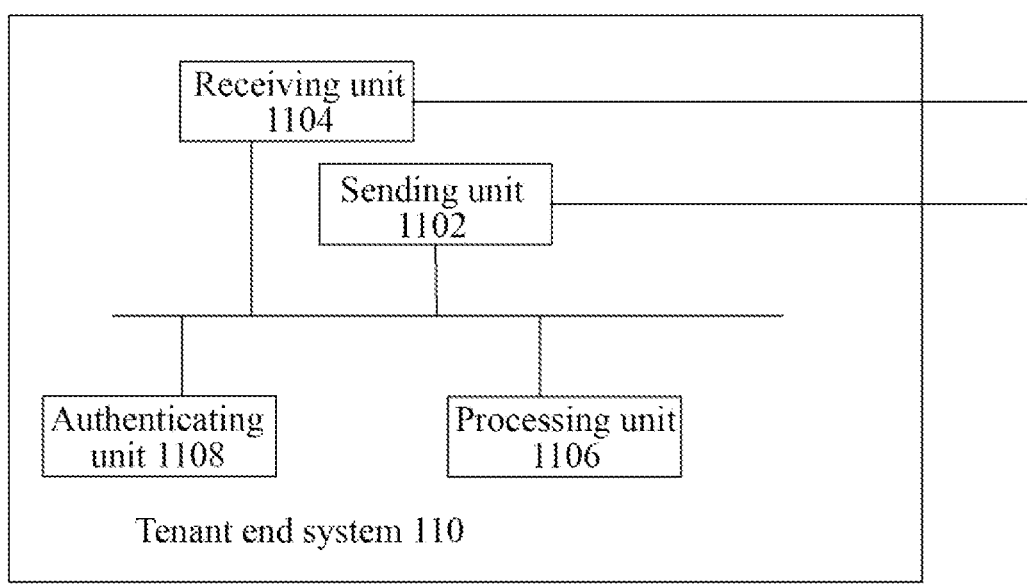
FIG. 11 is a schematic diagram of a preferred structure of the tenant end system in accordance with an embodiment of the present document.

As shown in FIG. 11, the embodiment of the present document further provides a preferred tenant end system, which comprises:

1) sending unit 1102, configured to send a network virtualization edge (NVE) auto-discovery broadcast message carrying a virtual network attribute; preferably, the virtual network attribute may comprise but is not limited to the virtual network's name and/or the virtual network's identifier (VN-ID).

2) receiving unit 1104, configured to receive a NVE existing message returned by the NVEs;

3) processing unit 1106, configured to select one of the NVEs which send the NVE existing message as a serving NVE of the tenant end system;

wherein, the sending unit 1102 is further configured to send a NVE request message to the serving NVE, the receiving unit 1104 is further configured to receive the NVE confirmation message sent by the serving NVE;

4) authenticating unit 1108, configured to perform a virtual network (VN) identity authentication with the NVE after the receiving unit receives the NVE confirmation message sent by the serving NVE. Preferably, the authenticating unit 1108 comprises an authenticating module, which is configured to use the point to point protocol (PPP), the Extended Authentication Protocol (EAP) or the 802.1x (protocol) to perform the VN identity authentication of the tenant end system.

The connection relationship between the various components is shown in FIG. 11.

In the present embodiment, the tenant end system may comprise, but is not limited to at least one of the following: virtual machine (VM), physical computer, or server.

The present document provides a variety of improved methods to achieve the NVE auto-discovery broadcast message, the NVE existing message, the NVE request message, and the NVE confirmation message. In the following, these improved methods will be described in detail. It should be noted that the following improved methods may be combined to use in the case of no conflicts, and the present document does not limit this.

As an improved method, the NVE auto-discovery broadcast message, the NVE existing message, the NVE request message and the NVE confirmation message are specified types of messages, wherein, the specified types of messages comprise a message type field, and the value of the message type field is predefined.

As another improved method, the NVE auto-discovery broadcast message, the NVE existing message, the NVE request message and the NVE confirmation message comprise a field representing the VN-ID; the NVE auto-discovery broadcast message and the NVE request message comprise a field used to represent the name of the virtual network.

As another improved method, the NVE auto-discovery broadcast message, the NVE existing message, the NVE request message and the NVE confirmation message are messages in the PPPoE with a new version number, wherein the messages in the PPPoE with the new version number comprises a field used to represent the VN-ID information.

As another improved method, the NVE auto-discovery broadcast message, the NVE existing message, the NVE request message and the NVE confirmation message comprise a TAG field used to represent the virtual network (VN) and/or NVE attributes, wherein, the TAG field comprises at least one of the following: the VLAN information, the QoS requirement information, the IP address information of the tenant end system, the NVE type information, the NVE capability information, and the public keys supported in the messages between the tenant end system and the NVE.

As another improved method, the NVE auto-discovery broadcast message, the NVE existing message, the NVE request message and the NVE confirmation message are realized with L3 messages.

As another improved method, the NVE auto-discovery broadcast message, the NVE existing message, the NVE request message and the NVE confirmation message comprise: fields used to represent the VN's name, VN-ID, the NVE's physical address, and the NVE's IP address. Preferably, the field used to represent the VN's name, VN-ID, the NVE's physical address, and the NVE's IP address are standalone fields in the NVE auto-discovery broadcast message, the NVE existing message, the NVE request message and the NVE confirmation message, or are represented with option fields.

As another improved method, the NVE auto-discovery broadcast message, the NVE existing message, the NVE request message and the NVE confirmation message are messages in the DHCP with a new version number. Wherein, the messages in the DHCP with the new version number comprise fields used to indicate the VN's name, the VN-ID, the NVE's physical address, and the NVE's IP address. The fields used to indicate the VN's name, the VN-ID, the NVE's physical address and the NVE's IP address are obtained by adding new fields into the DHCP messages with the old version number, or implemented with new option fields.

The Tenth Embodiment

Figure 12:
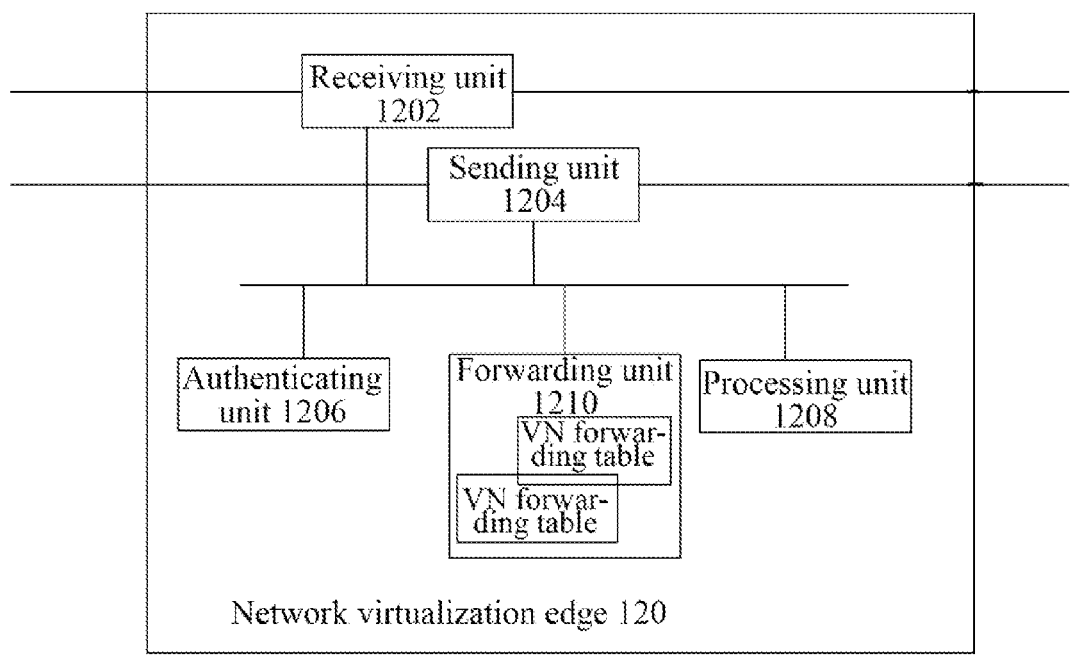
FIG. 12 is a schematic diagram of a preferred structure of the network virtualization edge in accordance with an embodiment of the present document.

As shown in FIG. 12, the embodiment of the present document further provides a preferred network virtualization edge (NVE), comprising:

1) receiving unit 1202, configured to receive a network virtualization edge (NVE) auto-discovery broadcast message carrying a virtual network attribute sent by the tenant end system;

2) sending unit 1204, configured to send a NVE existing message to the tenant end system in response to the NVE auto-discovery broadcast message; wherein the receiving unit 1202 is further configured to receive the NVE request message sent by the tenant end system in response to the NVE existing message; the sending unit 1204 is further configured to send a NVE confirmation message to the tenant end system in response to the NVE request message;

3) authenticating unit 1206, configured to perform a virtual network (VN) authentication of the tenant end system after the sending unit sends the NVE confirmation message; preferably, the authenticating unit 1206 comprises: an authenticating module, configured to initiate a VN identity authentication of the tenant end system after the sending unit sends the NVE confirmation message, and obtain the VN-ID after the tenant end system passes through the VN identity authentication, and send an authentication success response message and the VN-ID to the tenant end system;

4) processing unit 1208, configured to generate a VN instance in the case that the tenant end system passes through the virtual network (VN) identity authentication and the network virtualization edge (NVE) does not have a VN instance, wherein, the VN instance comprises: a VN forwarding table; the NVE adds an entry corresponding to the tenant end system in the VN forwarding table; or directly add an entry corresponding to the tenant end system in the VN forwarding table in the existing VN instance in the case that the tenant end system passes through the VN identity authentication and the NVE already has a VN instance;

5) forwarding unit 1210, configured to store the VN forwarding table and forward messages according to the VN forwarding table.

The connection relationship between the various components is shown in FIG. 12.

Preferably, the authenticating module 1206 can use the Point to Point Protocol (PPP), the Extensible Authentication Protocol (EAP) or the 802.1x to perform a VN identity authentication of the tenants terminal system.

As an improved method, the VN forwarding table is a forwarding table based on MAC addresses, or a routing and forwarding table based on IP address.

As an improved method, the receiving unit also supports receiving other control protocols and service data; the sending unit also supports sending other control protocols and service data; the processing unit also supports processing other control protocols, and updating contents in the VN forwarding table in accordance with other control protocols.

Preferably, the NVE in the present embodiment comprises at least one of the following: Hypervisor, access switch, router or other network devices.

A variety of improved method proposed by each of the abovementioned embodiments for the NVE auto-discovery broadcast message, the NVE existing message, the NVE request message and the NVE confirmation message are also applicable to the NVE shown in FIG. 12.

In another embodiment, a software tool is also provided, and the software is used to perform the technical scheme described in the abovementioned embodiments and the preferred embodiments.

In another embodiment, it also provides a storage medium, and the storage medium stores the abovementioned software, and the storage medium comprises but is not limited to: compact disc, floppy disk, hard disk, flash memory or the like.

Obviously, a person skilled in the art should understand that respective modules or steps in the present document can be implemented with general-purpose computing devices, they can be concentrated on a single computing device or distributed in a network consisting of multiple computing devices, alternatively, they may be executed by program codes executable by computing devices, so that they can be stored in storage means and executed by computing devices, or they can be made into individual integrated circuit modules, or some of the modules or steps can be made into a single integrated circuit module to implement. Therefore, the present document is not limited to any specific combination of hardware and software.

The above description is only preferred embodiments of the present document and not intended to limit the present document, and for a person skilled in the art, the present document may have various changes and modifications. Any changes, equivalent replacements and improvements made within the spirit and principle of the present document should be included within the protection scope of the present document.

INDUSTRIAL APPLICABILITY

In an embodiment of the present document, by the interaction between the VM's tenant end system and the NVE, it can achieve that the tenant end system automatically discovers the NVEs. In addition, the NVE can be automatically configured according to the VN Related information after the VM's tenant end system passes the authentication, so that it does not need to manually configure the NVE accordingly, so as to solve the technical problem in the related art that the virtual network configuration efficiency is low due to manually configuring the virtual network, and achieve the technical effect of improving the virtual network configuration efficiency.

What is claimed is:

1. A virtual network auto-discovery and auto-configuration method, comprising:
   a tenant end system automatically discovering network virtualization edges (NVEs);
   the NVE initiating a virtual network (VN) identity authentication of the tenant end system;
   the NVE automatically configuring a VN forwarding table of the VN after the tenant end system passes through the VN identity authentication;
   wherein, the step of the tenant end system automatically discovering network virtualization edges (NVEs) comprises:
   the tenant end system sending a network virtualization edge (NVE) auto-discovery broadcast message carrying a virtual network attribute;
   the tenant end system receiving a NVE existing message returned by the NVEs;
   the tenant end system selecting one of the NVEs which send the NVE existing message as a serving NVE of the tenant end system, and sending a NVE request message to the serving NVE;
   the tenant end system receiving a NVE confirmation message sent by the serving NVE.

2. The method of claim 1, wherein, the NVE auto-discovery broadcast message, the NVE existing message, the NVE request message and the NVE confirmation message are specified types of messages, wherein, a message type field is included in the specified types of messages, and a value of the message type field is pre-defined.

3. The method of claim 1, wherein, the virtual network attribute is a virtual network's identifier (VN-ID) and/or a virtual network's name.

4. The method of claim 1, wherein,
   all of the NVE auto-discovery broadcast message, the NVE existing message, the NVE request message and the NVE confirmation message comprise a field indicating the VN-ID; the NVE auto-discovery broadcast message and the NVE request message comprise a field indicating the virtual network's name; or
   the NVE auto-discovery broadcast message, the NVE existing message, the NVE request message and the NVE confirmation message are messages in a point to point protocol over Ethernet (PPPoE) with a new version number, wherein, the messages in the PPPoE with the new version number comprise a field indicating VN-ID information; or
   the NVE auto-discovery broadcast message, the NVE existing message, the NVE request message and the NVE confirmation message comprise a TAG field indicating the virtual network (VN) and/or NVE attributes, wherein, the TAG field comprises at least one of the following: virtual local access network (VLAN) information, quality of service (QoS) requirement information, internet protocol (IP) address information of the tenant end system, NVE type information, NVE capability information, and public keys supported in messages between the tenant end system and the NVEs.

5. The method of claim 1, wherein, the tenant end system comprises at least one of the following: a virtual machine (VM), a physical computer, or a server.

6. The method of claim 1, wherein, the NVE auto-discovery broadcast message, the NVE existing message, the NVE request message and the NVE confirmation message are implemented with layer 3 (L3) messages;
wherein, the NVE auto-discovery broadcast message, the NVE existing message, the NVE request message and the NVE confirmation message comprise: fields used to indicate the VN's name, the VN-ID, the NVE's physical address, and the NVE's IP address;
wherein, the fields used to indicate the VN's name, the VN-ID, the NVE's physical address and the NVE's IP address are standalone fields in the NVE auto-discovery broadcast message, the NVE existing message, the NVE request message and the NVE confirmation message, or are represented with option fields;
wherein, the NVE auto-discovery broadcast message, the NVE existing message, the NVE request message and the NVE confirmation message are messages in a dynamic host configuration protocol (DHCP) with a new version number, wherein, the messages in the DHCP with the new version number comprise fields indicating the VN's name, the VN-ID, the NVE's physical address, and the NVE's IP address; the fields used to indicate the VN's name, the VN-ID, the NVE's physical address and the NVE's IP address are obtained by adding new fields into the DHCP messages with an old version number or implemented with new option fields.

7. The method of claim 1, wherein, the step of the NVE initiating a virtual network (VN) identity authentication of the tenant end system comprises:
the NVE initiating a VN identity authentication of the tenant end system after sending the NVE confirmation message;
wherein, the VN identity authentication is implemented by Point to Point Protocol (PPP), or Extensible Authentication Protocol (EAP), or 802.1x.

8. The method of claim 1, wherein, the step of the NVE automatically configuring the VN forwarding table of the VN comprises:
judging whether there exists a VN instance in the NVE or not;
if there exists a VN instance, the NVE directly adding an entry corresponding to the tenant end system into the VN forwarding table in the existing VN instance;
if there exists no VN instance, the NVE generating a VN instance, wherein the VN instance comprises: a VN forwarding table; the NVE adding an entry corresponding to the tenant end system into the VN forwarding table in the generated VN instance.

9. The method of claim 1, wherein, the VN forwarding table is a forwarding table based on MAC address, or a routing and forwarding table based on IP address.

10. A tenant end system, comprising:
a sending unit, configured to send a network virtualization edge (NVE) auto-discovery broadcast message carrying a virtual network attribute;
a receiving unit, configured to receive a NVE existing message returned by NVEs;
a processing unit, configured to select one of the NVEs sending the NVE existing message as a serving NVE of the tenant end system;
wherein the sending unit is further configured to send a NVE request message to the serving NVE, and the receiving unit is further configured to receive a NVE confirmation message sent by the serving NVE;
the system further comprises:
an authenticating unit, configured to perform a virtual network (VN) identity authentication with the NVE after the receiving unit receives the NVE confirmation message sent by the serving NVE.

11. The tenant end system of claim 10, wherein, the NVE auto-discovery broadcast message, the NVE existing message, the NVE request message and the NVE confirmation message are specified types of messages, wherein, the specified types of messages comprise a message type field, and a value of the message type field is pre-defined.

12. The tenant end system of claim 10, wherein, the tenant end system comprises at least one of the following: a virtual machine (VM), a physical computer, or a server.

13. The tenant end system of claim 10, wherein, the NVE auto-discovery broadcast message, the NVE existing message, the NVE request message and the NVE confirmation message are layer 2 (L2) messages, or are implemented with layer 3(L3) messages.

14. The tenant end system of claim 10, wherein, the authenticating unit comprises:
an authenticating module, configured to support using Point to Point Protocol (PPP) or Extensible Authentication Protocol (EAP) or 802.1x to perform a VN identity authentication of the tenant end system.

15. A network virtualization edge, comprising:
a receiving unit, configured to receive a network virtualization edge (NVE) auto-discovery broadcast message carrying a virtual network attribute sent by the tenant end system;
a sending unit, configured to send a NVE existing message to the tenant end system in response to the NVE auto-discovery broadcast message;
an authenticating unit, configured to perform a virtual network (VN) identity authentication of the tenant end system after the sending unit sends the NVE confirmation message;
a processing unit, configured to generate a VN instance in the case that the tenant end system passes through the virtual network (VN) identity authentication and the network virtualization edge (NVE) has no VN instance, wherein, the VN instance comprises: a VN forwarding table; the NVE adds an entry corresponding to the tenant end system in the VN forwarding table; or directly adds an entry corresponding to the tenant end system in the VN forwarding table in an existing VN instance in the case that the tenant end system passes through the VN identity authentication and the NVE already has the VN instance; and
a forwarding unit, configured to store the VN forwarding table and forward messages according to the VN forwarding table;
wherein, the receiving unit is further configured to receive the NVE request message sent by the tenant end system in response to the NVE existing message; the sending unit is further configured to send a NVE confirmation message to the tenant end system in response to the NVE request message.

16. The network virtualization edge of claim 15, wherein, the authenticating unit comprises:
an authenticating module, configured to initiate a VN identity authentication of the tenant end system after the sending unit sends a NVE confirmation message, and obtain a VN-ID after the tenant end system passes through the VN identity authentication, and send an authentication success response message and the VN-ID to the tenant end system.

17. The network virtualization edge of claim 16, wherein, the authenticating module is further configured to support using Point to Point Protocol (PPP), Extensible Authentication Protocol (EAP) or 802.1x to perform a VN identity authentication of the tenant end system.

18. The network virtualization edge of claim 15, wherein, the VN forwarding table is a forwarding table based on media access control (MAC) address, or a routing and forwarding table based on IP address.

19. The network virtualization edge of claim 15, wherein, the NVE comprises at least one of the following: a Hypervisor, an access switch, a router or another network device.

* * * * *